US010609527B2

(12) United States Patent
Naqvi

(10) Patent No.: US 10,609,527 B2
(45) Date of Patent: *Mar. 31, 2020

(54) SYSTEM AND METHOD FOR CONTROL AND MANAGEMENT OF RESOURCES FOR CONSUMERS OF INFORMATION

(71) Applicant: Sensoriant, Inc., Cedar Knolls, NJ (US)

(72) Inventor: Shamim A. Naqvi, Morristown, NJ (US)

(73) Assignee: Sensoriant, Inc., Cedar Knolls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,436

(22) Filed: Jan. 9, 2019

(65) Prior Publication Data
US 2019/0208382 A1 Jul. 4, 2019

Related U.S. Application Data

(60) Continuation of application No. 15/623,672, filed on Jun. 15, 2017, now Pat. No. 10,181,148, which is a
(Continued)

(51) Int. Cl.
H04W 24/00 (2009.01)
H04W 4/40 (2018.01)
G06F 16/9537 (2019.01)
G06Q 30/02 (2012.01)
H04W 4/021 (2018.01)
H04W 4/18 (2009.01)
H04W 4/60 (2018.01)
G06Q 30/06 (2012.01)
(Continued)

(52) U.S. Cl.
CPC .......... *H04W 4/40* (2018.02); *G06F 16/9537* (2019.01); *G06Q 30/02* (2013.01); *G06Q 30/0631* (2013.01); *H04W 4/021* (2013.01); *H04W 4/023* (2013.01); *H04W 4/027* (2013.01); *H04W 4/18* (2013.01); *H04W 4/60* (2018.02); *G06F 3/0482* (2013.01); *H04L 67/306* (2013.01); *H04M 1/72519* (2013.01)

(58) Field of Classification Search
CPC ....... H04W 4/02; H04W 64/00; H04W 8/245; H04W 4/40; H04W 4/021; H04W 4/60; H04W 4/023; H04W 4/027; H04W 4/18; H04M 1/72519; H04L 29/06; H04L 29/08072; H04L 67/306; G06F 16/9537; G06F 3/0482; G06Q 30/02; G06Q 30/0631
USPC ........................ 455/456.1, 550.1, 452.2, 418
See application file for complete search history.

(56) References Cited

U.S. PATENT DOCUMENTS

2006/0233173 A1 10/2006 Pullela
2007/0237096 A1 10/2007 Vengroff
(Continued)

Primary Examiner — Danh C Le
(74) Attorney, Agent, or Firm — Mayer & Williams, PC; Stuart H. Mayer

(57) ABSTRACT

A system and method is provided for using information broadcast by devices and resources in the immediate vicinity of a mobile device, or by sensors located within the mobile device itself, to ascertain and make a determination of the immediate environment and state of the mobile device. The sensor data is then used to identify situational profiles to target and determine the relevance of apps, advertisements, content, and recommendations.

26 Claims, 12 Drawing Sheets

Related U.S. Application Data continuation of application No. 14/851,149, filed on Sep. 11, 2015, now Pat. No. 9,715,707, which is a division of application No. 12/931,153, filed on Jan. 25, 2011, now abandoned, and a continuation-in-part of application No. 12/804,448, filed on Jul. 21, 2010, now Pat. No. 9,210,528.

(51) Int. Cl.
*H04W 4/02* (2018.01)
*H04M 1/725* (2006.01)
*H04L 29/08* (2006.01)
*G06F 3/0482* (2013.01)

(56) References Cited

U.S. PATENT DOCUMENTS

| | | | |
|---|---|---|---|
| 2007/0254669 A1 | 11/2007 | Katz | |
| 2008/0092156 A1* | 4/2008 | Ferrone | H04H 60/33 725/13 |
| 2008/0209052 A1* | 8/2008 | Velan | H04L 29/06 709/228 |
| 2008/0271109 A1 | 10/2008 | Singh | |
| 2009/0132197 A1* | 5/2009 | Rubin | G01C 21/20 702/141 |
| 2009/0203359 A1* | 8/2009 | Makhoul | G06Q 30/02 455/412.2 |
| 2010/0280892 A1* | 11/2010 | Uzunalioglu | G06Q 30/02 705/14.13 |
| 2011/0009107 A1 | 1/2011 | Guba | |
| 2011/0069702 A1* | 3/2011 | Oktay | H04L 65/1046 370/352 |
| 2011/0113467 A1 | 5/2011 | Kgarwal | |
| 2011/0299478 A1* | 12/2011 | Clark | H04L 67/30 370/329 |
| 2012/0055022 A1* | 3/2012 | Matsumoto | B41J 2/1603 29/890.1 |
| 2012/0151533 A1* | 6/2012 | Kandanala | G06Q 30/0269 725/60 |
| 2012/0324482 A1 | 12/2012 | Park | |
| 2013/0054962 A1 | 2/2013 | Chawla | |
| 2013/0145293 A1 | 6/2013 | Yoakum | |
| 2013/0246175 A1 | 9/2013 | Bilange | |
| 2014/0087760 A1 | 3/2014 | Bennett | |

* cited by examiner

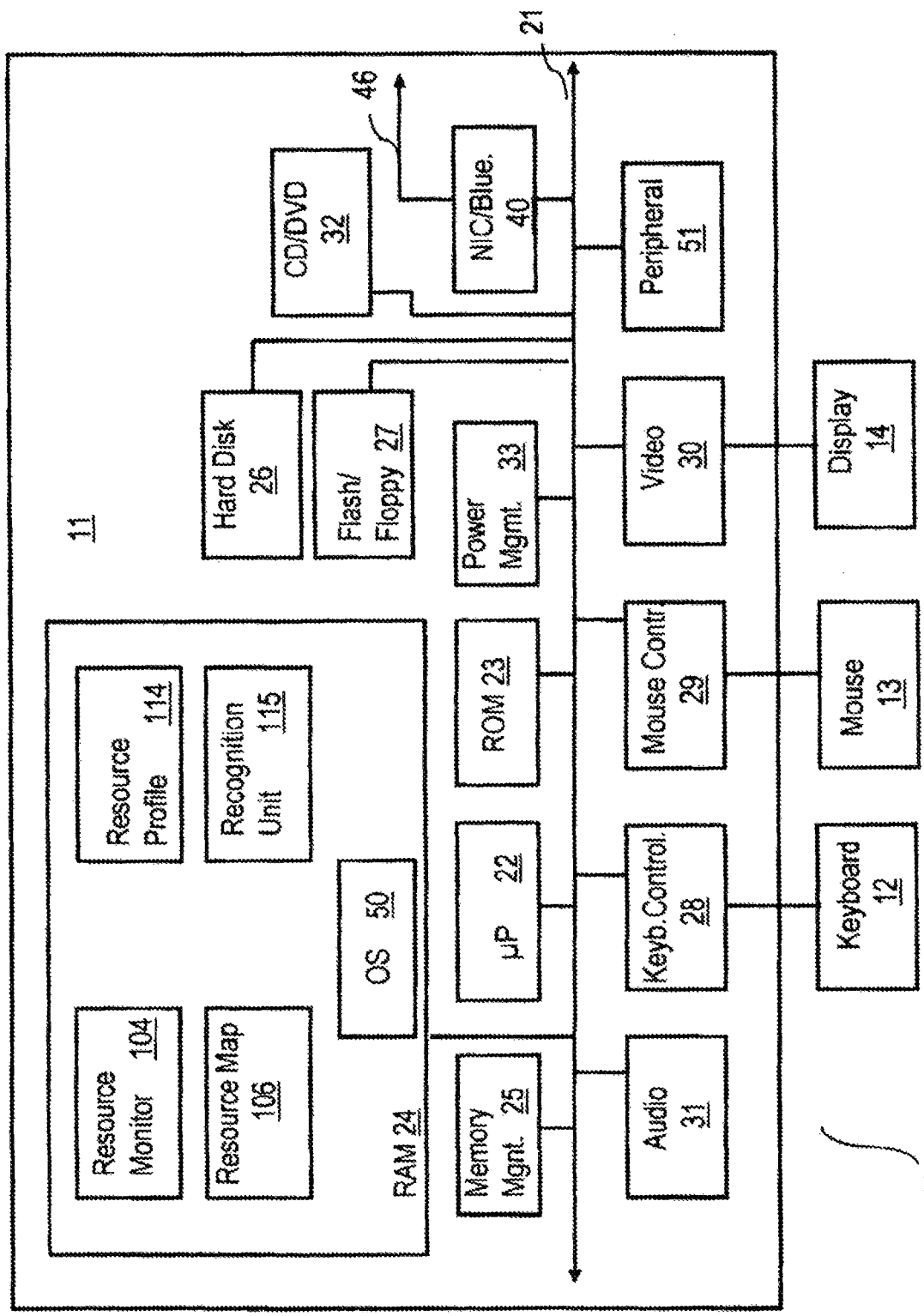

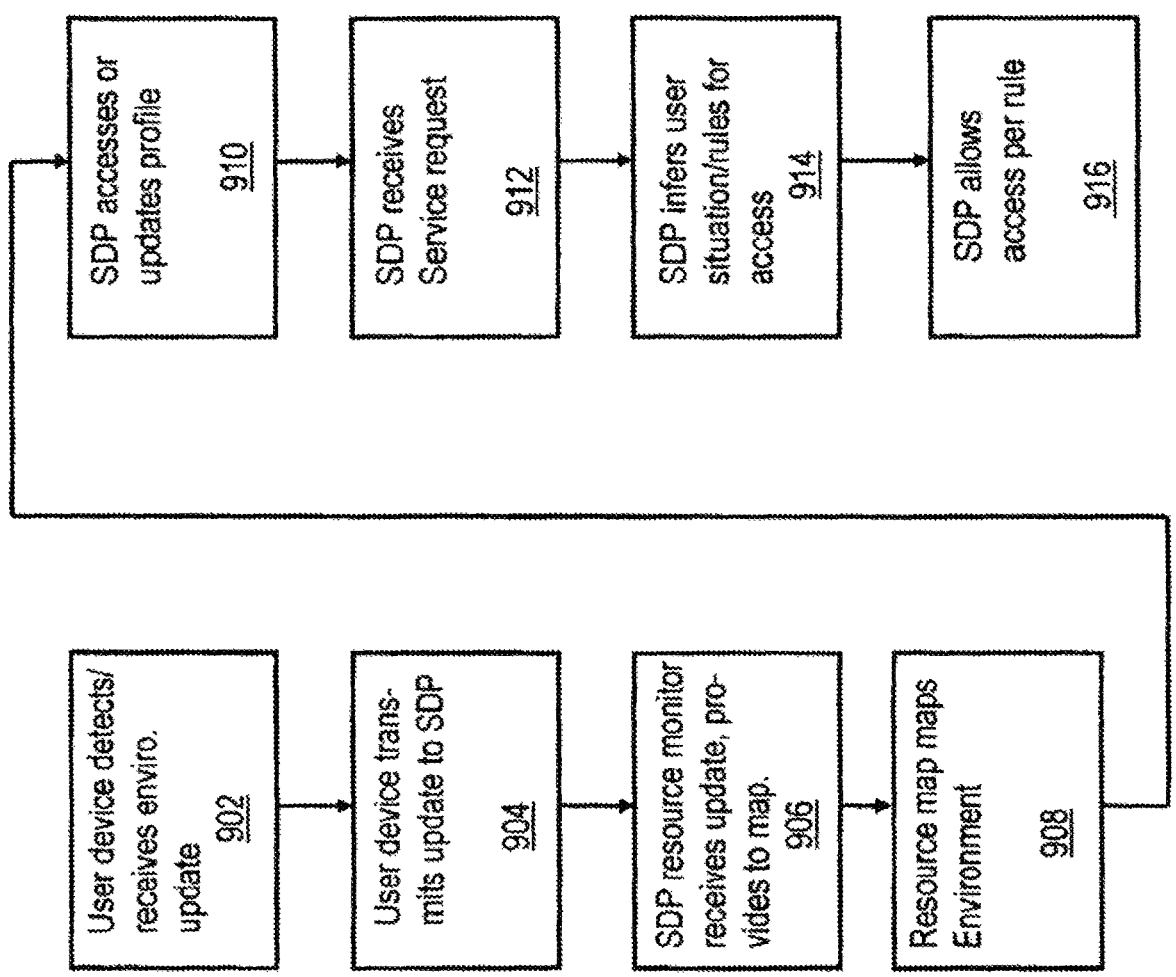

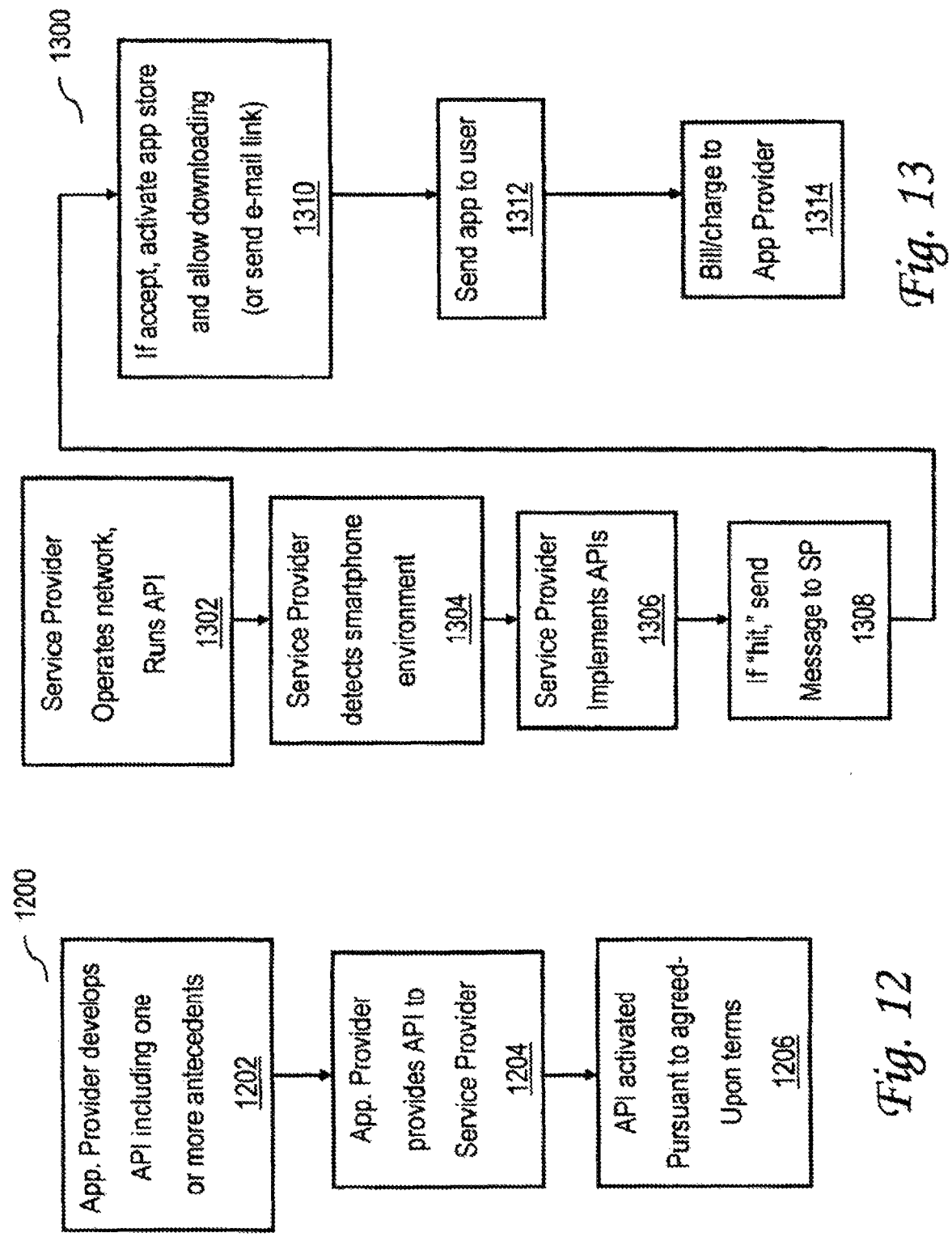

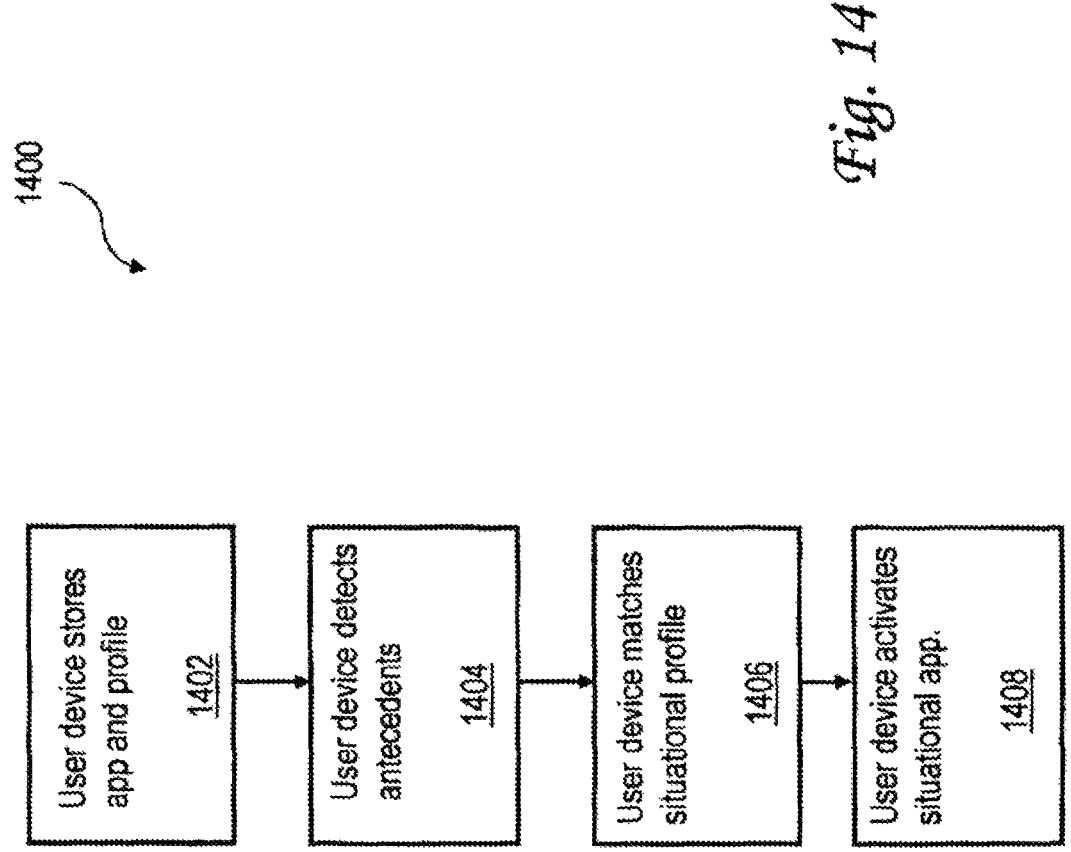

SYSTEM AND METHOD FOR CONTROL AND MANAGEMENT OF RESOURCES FOR CONSUMERS OF INFORMATION

PRIORITY CROSS-REFERENCE TO RELATED APPLICATIONS

This application is a divisional and claims priority from each of U.S. patent application Ser. No. 12/931,153 filed Jan. 25, 2011 which is a continuation-in-part of U.S. patent application Ser. No. 12/804,448, filed Jul. 21, 2010 which are expressly incorporated herein by reference.

FIELD OF THE INVENTION

The present invention relates to the delivery, discovery, management and control of information to mobile consumers, and to the efficient use and control of these resources to consume and generate information.

BACKGROUND OF THE INVENTION

The phenomenal growth of advanced mobile devices, or smartphones, has been accompanied by the development of "app stores." App stores, typically provided by smartphone manufacturers, are online facilities that allow applications to be downloaded to a mobile phone or device. These applications can then provide services to the mobile device user. For example, such applications can include electronic books and magazines, financial tools that allow users to access bank accounts and investments, etc.

With mobile devices and smartphones becoming an increasingly large part of a service provider's network, app stores now contain an increasing number of applications. For example, the Apple app store is said to include more than a hundred seventy thousand applications for download, while the Android store has more than fifty thousand. With so many apps available, finding a useful app for a particular purpose or suitable for a particular occasion is fraught with difficulties. There are too many apps to try every one of them or even randomly choose some to try. Consequently, most users rely on word of mouth or other indicia of popularity to decide which apps to download and use.

Many Internet and other sites now try to guess the goal or motivation of an online user. For example, a search engine may examine the search requests of an online user and guess that the user is interested in finding a restaurant. The search engine may then "complete the request" by suggesting a restaurant, show an advertisement, offer a deal or coupon, or offer to make a reservation for the user. However, the problem is made more complex for mobile users. More particularly, the nature of a mobile device is such that mobile users often do not engage in search requests, even when the mobile device is turned on.

There is, therefore, a need for an entity to match the needs of a use of a mobile device with the available apps in order for successfully carrying out or limiting and controlling particularized tasks. There is also a need to infer the goal and motivation of a mobile user, particularly if the mobile user does not issue many search requests.

SUMMARY OF THE INVENTION

These and other drawbacks in the prior art are overcome in large part by a system and method according to embodiments of the present invention.

A system in accordance with embodiments of the present invention defines one or more situational profiles based on sensory data received from a mobile device. The system then makes recommendations to a user, the recommendations comprising one or more apps, coupons, or advertisements that may be associated with a corresponding situational profile. In some embodiments, the recommendation is made using text or e-mail messaging. In some embodiments, the particular recommendation may be based on a contract with a service or application provider.

A telecommunications method in accordance with embodiments of the present invention includes accessing a real-time sensory database based, for example, on an environment map, and a rules database. A rules database includes one or more rules defining antecedents and a resulting consequent, which can be the name of a situational profile. The method includes using sensory data collected from the mobile device and its environment to infer the user's situation or environment. The method further includes making recommendations based on the situational profile.

A method in accordance with embodiments of the present invention includes providing a database of smartphone applications; receiving registry map information of network environmental indicia from a mobile device concurrently along with location information to a home location registry; generating an environment map for the mobile device based on the registry map information and location information, the environment map including a device, application, and network component environment; assigning a profile to the user of the mobile device based on the environment map (sensory data); and making recommendations based on the environment map to a user of the smartphone, the recommendations including but not limited to advertisements, apps, coupons, and suchlike.

A system in accordance with embodiments of the present invention is configured to monitor a user device based on sensory data and recommend or advertise one or more apps based on the sensory data. Potential advertisers define one or more antecedents corresponding to sensed conditions and make recommendations based upon meeting or satisfying the conditions.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 7 is an exemplary SDP in accordance with embodiments of the present invention.

FIG. 8 is an exemplary user device in accordance with embodiments of the present invention.

FIG. 9 is a flowchart illustrating operation of embodiments of the present invention.

FIG. 12 is a flowchart illustrating operation of embodiments of the present invention.

FIG. 13 is a flowchart illustrating operation of embodiments of the present invention.

FIG. 14 is a flowchart illustrating operation of embodiments of the present invention.

DETAILED DESCRIPTION OF THE EMBODIMENTS

Environment Map System

Figure 1:
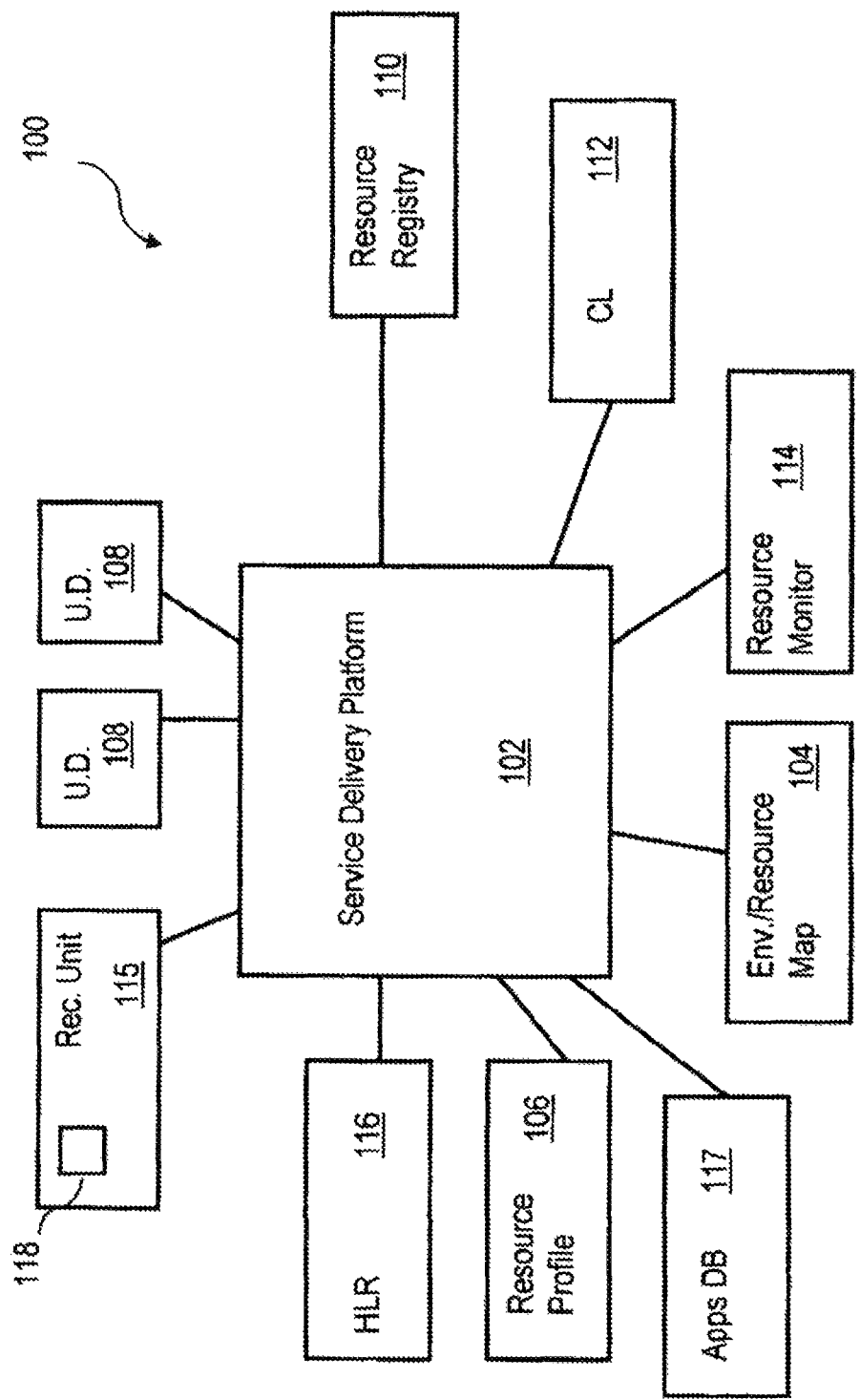
FIG. 1 illustrates an exemplary system according to embodiments of the present invention.

In accordance with embodiments of the present invention, a system and method is provided for using information broadcast by devices and resources in the immediate vicinity of a mobile device, or by sensors located within the mobile device itself, to ascertain and make a determination of the immediate environment and state of the mobile device. This determination may be used to control and manage the actions that the device is asked to carry out by or on behalf of the user. Alternatively, this determination may be used to provide a user of the mobile device with recommendations, e.g., for apps particularized to the device environment and state.

Advantageously, a carrier can define hundreds of device profiles and automatically and dynamically associate them with user devices, based on the device sensing its environment. The profiles allow or disallow certain actions or combinations of actions, as will be described in greater detail below.

Embodiments of the present invention address locating mobile devices in a telecommunications network that uses a mechanism of "paging requests" by certain network elements and "location updates" by mobile devices to update and maintain a database called the Home Location register (HLR). The term "location" typically refers to the cellular site (cell site) within which the mobile device was last known to be located, although other location methods, including satellite or triangulation-based methods, may be employed.

In accordance with embodiments of the present invention, paging requests and location updates include not only cell site information, but also the availability of other access networks to the mobile device such as WiFi, Bluetooth, WiMax, etc. Moreover, any other resources, e.g., display devices, that could be used in conjunction with the mobile device that are "attached" to the new access network and which "announce" their capabilities and availability are also included in the updates. Internal sensor information, such as device orientation, motion sensors, etc., may also be provided.

The information so obtained from the environment surrounding a mobile device is captured in a series of update messages, referred to as resource updates, by a network facility that processes and stores the messages.

In an exemplary embodiment of the present invention, the mobile device contains a registry wherein all applications are authenticated and registered before they can be used in the mobile device. The registry may additionally contain a profile stating what resources an application needs. A network facility uses an application profile and the information obtained from resource updates to dynamically assign a plurality of profiles to the mobile device. A profile may be re-assigned and modified whenever the resource updates or the registry information in the mobile device warrant a change based on service logic executing in the network facility.

Consider, for example, a mobile device that is engaged in a voice telephone call connected to a circuit-switched network. Assume the mobile device contains applications for streaming mobile video and SMS text messaging, the applications registered within the registry of the mobile device. The mobile device will have an associated profile in the network facility that details the resources available to the mobile device, i.e., the circuit-switched network, the mobile video and SMS applications, and any resources needed by the applications.

Now, assume a Bluetooth access network announces itself, its capabilities and its resources. For example, the Bluetooth network may announce its type is "automobile" and that it supports a display device with certain attributes, e.g., resolution, size, etc. Assume the mobile device attaches itself to the new network.

The mobile device will update its registry to include the Bluetooth network and its associated display device. Resource updates from the mobile device to the network facility likewise now list the new access network available to the device (Bluetooth), and any resources that have become available, i.e., the new display device.

This causes the network facility to assign a new profile to the mobile device wherein delivery and display of mobile video may now be effectuated on the newly discovered display device, i.e., the monitor in the automobile. Moreover, a policy restriction stated by the service provider preventing SMS messages from being received and initiated while in an automobile may cause the registry to disable the SMS application, thus preventing the user from launching or receiving SMS messages.

Thus, the user may now view mobile content on the automobile display, rather than on the display of the mobile device, and may not initiate or receive SMS messages while connected to the automobile's Bluetooth network. Alternatively, the service provider may choose to display a warning message to the user without disabling any of the applications in the mobile device.

Similarly, the device internal sensors may identify a particular physical orientation, location or other characteristic of the device, and cause the network facility to enable or disable based thereon. For example, if the device is being held to the ear, then a rule may be provided that video content is on the automobile display rather than the mobile device display. Alternatively, content may be displayed that is related to the sensory information obtained from the device, e.g., a coupon may be displayed indicating an event in close proximity to the current location of the device.

Turning now to the drawings and, with particular attention to FIG. 1, a diagram of a telecommunications system 100 according to an embodiment of the present invention is shown. The telecommunications system 100 may include a network facility, such as a service delivery platform 102, which may include or be in communication with a resource map 104, a resource profile 106, a recognition unit 115, and an apps database 117.

As will be explained in greater detail below, the resource map 104 contains an environment map of resources available to particular users, while the resource profile 106 defines particularized rules for making those resources available. The recognition unit 115, as will be explained in greater detail below, may be implemented as, or including, an inference engine and contains matching rules for comparing access policies to the user device's environment maps. That is, the service delivery platform 102 makes the resources available to the user devices in accordance with the resource map 104, profile 106, and recognition unit 115. In addition, the recognition unit 115 may include an apps recognition unit 118 for recommending particular apps to a user based on the environment or resource maps. That is, the apps recognition unit 118 can process one or more matching rules associated with a mobile device's environment to access particular apps from the apps database 117.

The service delivery platform 102 may include or be in communication with one or more user devices 108, and one or more Home Location Register (HLR) databases 116. Typically, as will be explained in greater detail below, an HLR 116 is provided for each cell site in the network to which the user device is registered. The user devices may further include or be in communication with resource registries 110, capabilities lists (CL) 112, and resource monitors 114.

As will be explained in greater detail below, the resource monitor 114 monitors the network and resource environment (either passively or actively) for devices or resources that have become available or unavailable.

The capabilities lists 112 are lists maintained by all network devices and resources. Specifically, it is envisaged that networks and devices, i.e., all resources, contain an internal capability list (CL) that contains not only the identification number of the resource but also attributes that may be of interest and use to applications. For example, a network CL may show the bandwidth, average latency, etc. A storage device CL may show the amount of available storage, the random access time, etc. A display device CL may show the resolution, number of pixels, etc. Indeed, the attributes in the CL for most popular devices and networks could be standardized. A particular device or entity's CL may be updated when it receives a CL from other resources.

Figure 2:
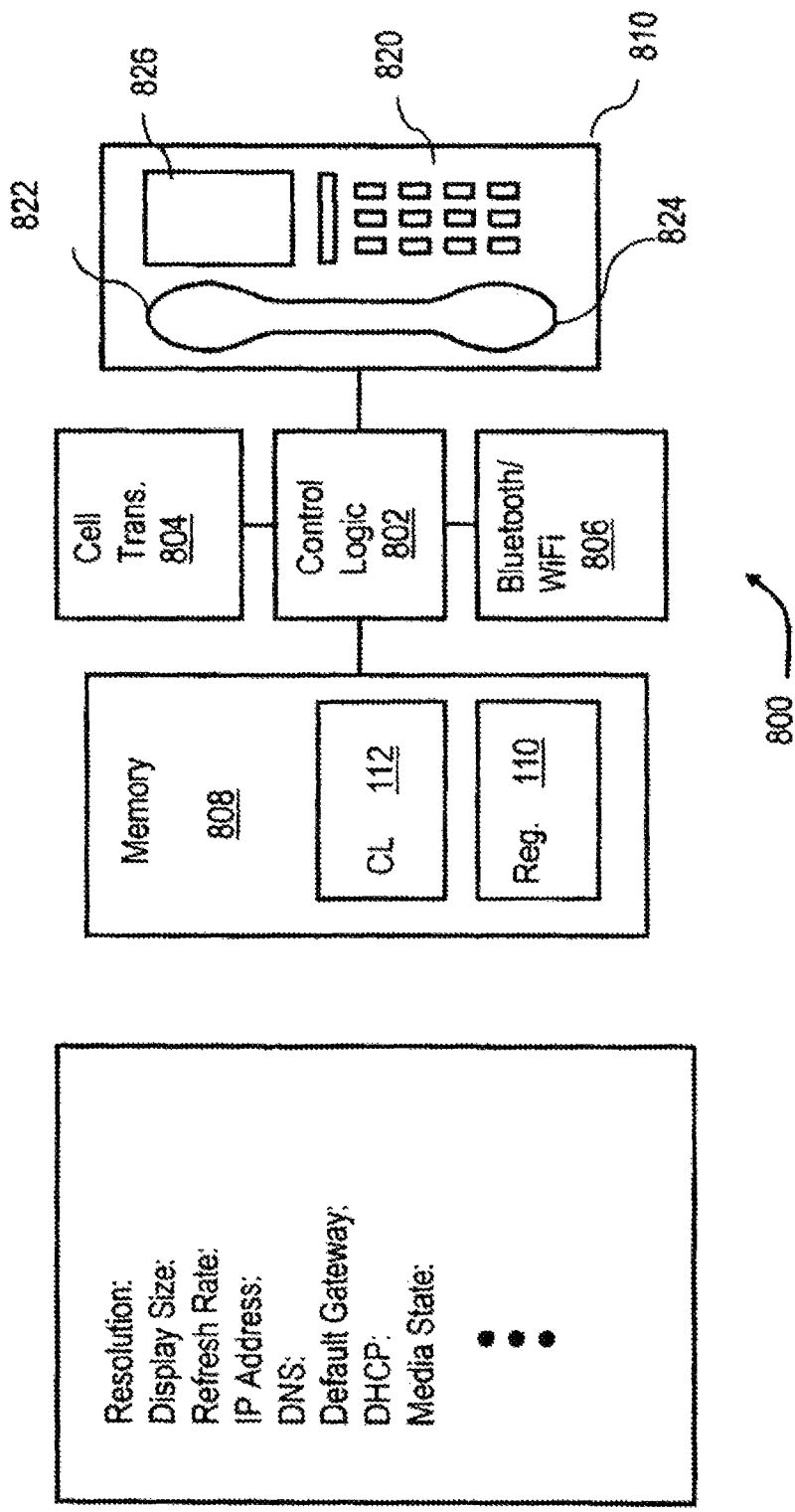
FIG. 2 illustrates a CL according to embodiments of the present invention.

The resource registries 110, on the other hand, are registries maintained by the user device of CLs of other devices that are currently available to it. FIG. 2 illustrates an exemplary CL for a display device that would be maintained in the registry of, say, a mobile telephone. Attributes in the CL describe the capabilities of the resource, its external interfaces, and intrinsic properties. For example, in the case of a display device, this can include resolution, display size, refresh rate, etc.

In certain embodiments, the user devices 108 may be implemented as telephones, cellular telephones, PDAs, computers, hard or soft clients, etc. While typically implemented as a smartphone, the user devices 108 also may be embodied as personal computers implementing a Windows operating system and the Explorer web browser. The user devices 108 thus may include telephony and other multimedia messaging capability using, for example, peripheral cameras, Webcams, microphones, and speakers (not shown) or peripheral telephony handsets.

In general, while the user devices 108 may implement one or more of the systems and methods described herein, the user devices also may implement one or more client devices or programs that communicate with services that implement such systems and methods provided remotely. In certain embodiments, the system 100 may also include other hardware and/or software components (e.g., gateways, proxy servers, registration server, presence servers, redirect servers, databases, applications, etc.).

The devices may also contain sensors for the state of the device and/or the state of its immediate environment, such as temperature, location and orientation. For example, several current mobile devices, such as smartphones, sense WiFi and cellular networks. Others sense the orientation of the device and allow the display to be used in either a portrait or a landscape mode, using a gravity-based pendulum sensor. In addition, proximity sensors turn the display off when the device is held to the car.

In accordance with embodiments of the present invention, such physical sensors may be used to define not simply local characteristics of the telephone, but may be sent to the registry and uploaded to the network for use in implementing and/or determining network and device access policies. Such information can further be used by the network to determine and recommend suitable content (ads, coupons, etc.) and smartphone apps.

As will be discussed in greater detail below, in order to receive information, a mobile device must be located by the network since it could physically be anywhere in the geographical area. Each mobile device periodically generates a message called the location update that is recorded in a Home Location Register (HLR) 116. The location update message typically contains the identity of the cell site in which the mobile device is currently located and some other network-related information, e.g., signal strength, etc.

Whenever the network needs to reach a mobile device, e.g., to initiate an incoming voice call, it sends a paging request to the last cell site in which the mobile device was located. Upon receiving the paging request the mobile device may respond to it. If, however, the mobile device has re-located to another cell site since the last location update, the paging request goes unanswered.

In accordance with embodiments of the present invention, the location update message from a mobile device 108 is further loaded with information about other resources that are currently "available" to the mobile device 108. Specifically, resources "announce" or make available their CLs. This may be achieved either by accepting a specific request on a well-defined interface and responding to the request or by doing a broadcast. The current generation of RFID devices, by way of example, announce themselves through a broadcast mechanism, as do certain WiMax and Wifi networks. The mobile device 108 receives the announcements and aggregates them into one or more resource updates. In some embodiments of the present invention, the announcements include other device CLs. The mobile device 108 periodically broadcasts these resource updates, which are then received by the service delivery platform 102.

As can be appreciated, such updates from the user devices to the service delivery platform 102 via the HLRs 116 could be bandwidth and/or processing intensive. As such, in accordance with embodiments of the present invention, any of a variety of techniques may be used to minimize such effects. For example, less-bandwidth-intensive binary encoding may be used for the uplink registry messages. Alternatively, or additionally, rather than having the uplink occur every time the HLR is updated, it may occur only every other time, or every tenth time, or any other predetermined period. Also, rather than having periodic updates, in some embodiments, the registry upload may occur only if the registry itself has actually been updated.

Furthermore, the service delivery platform 102, in conjunction with the recognition unit 115, the resource map 104 and resource profile 106, may implement one or more databases (not shown) that will require speedy and frequent updates. Accordingly, embodiments of the present invention may make use of "active" databases to accommodate the heavy traffic.

Figure 3:
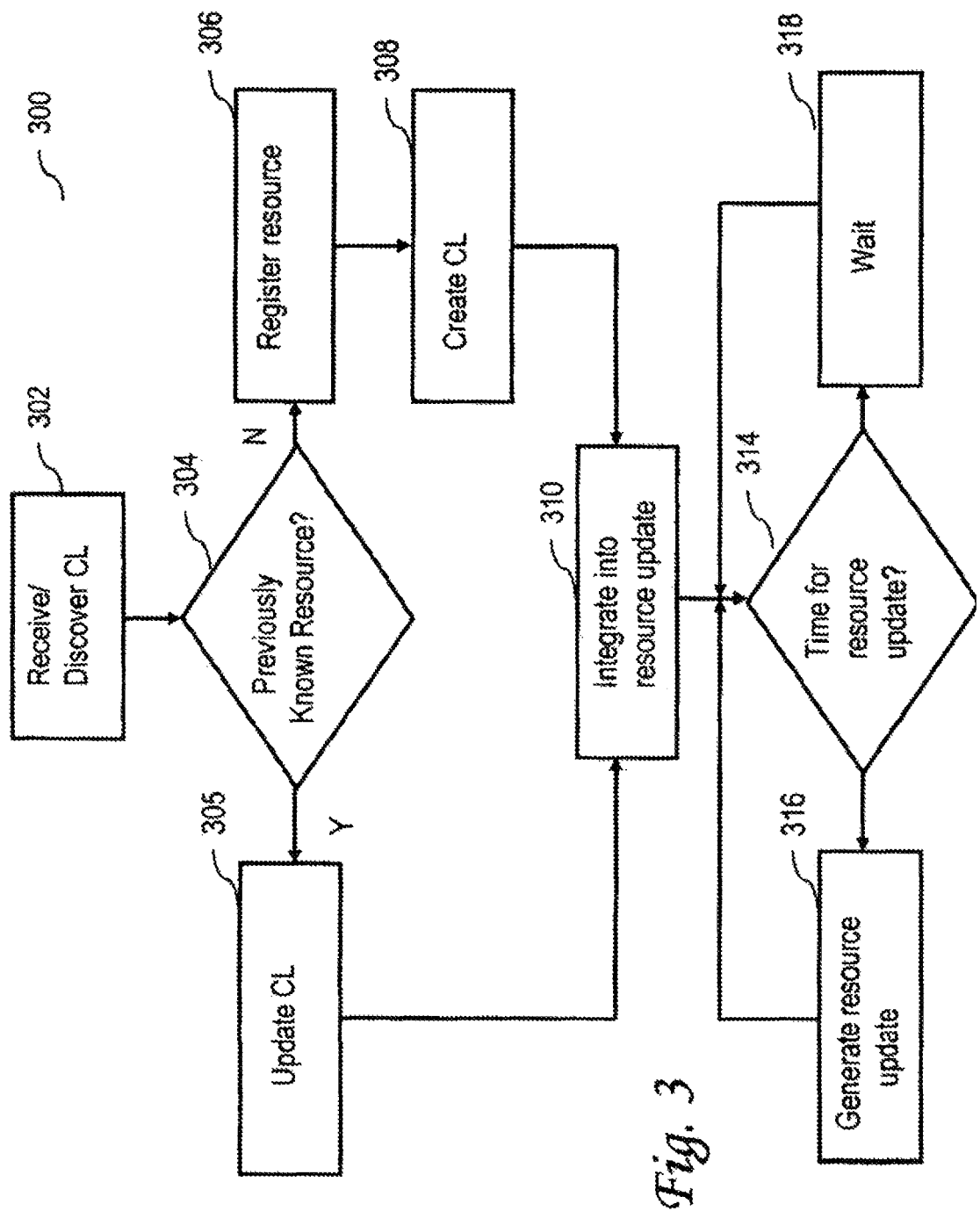
FIG. 3 is a flowchart illustrating operation of embodiments of the present invention.

Turning now to FIG. 3, a flowchart 300 illustrating operation of embodiment of the present invention is shown. The particular arrangement of elements in the flowchart 300 is not meant to imply a fixed order to the elements; embodiments can be practiced in any order that is practicable. More particularly, the flowchart 300 illustrates the aggregation process in a mobile device for a plurality of CLs In a process step 302, the mobile device 108 receives or discovers a CL. Receipt or discovery may be an out-of-band process and may be accomplished through the resource broadcasting or otherwise announcing presence and/or the CL.

In a process step 304, the user device 108 and, particularly, the resource monitor 114, checks if the CL is from a previously known resource. An affirmative response can lead to updating of the CL in the user device's lists (typically, the received CL may itself be updated and thus different from that previously stored), in a process step 306. Once updated, the information is integrated into the next resource update to the service delivery platform 102, as shown at process step 312. More particularly, the information is loaded with the location information to the Home Location Register 116, which provides it to the service delivery platform 102. As noted above, this may be sent with every HLR update, or on an event basis or some periodic basis, and/or using a low bandwidth binary encoding.

If, in process step 304, the CL was determined to be unknown, the resource will be registered in the mobile device registry 110, in a process step 308. A new CL is created for the new resource from the received CL in a process step 310, and the new CL is integrated into a resource update, in a process step 312. Once a resource update is ready, the update is sent to another process 1000 that perpetually loops on a timer at process step 314, and periodically generates a resource update, at steps 316, 318.

As noted above, resource updates from mobile devices are received and stored by the Service Delivery Platform (SDP) 102. Using information from the resource updates, the SDP 102 constructs a conceptual map 104 of the immediate environment of a mobile device, generates a resource profile 106 of a current environment of the device, and uses the recognition unit 115 to allow or disallow functionality based on the map.

Figure 4:
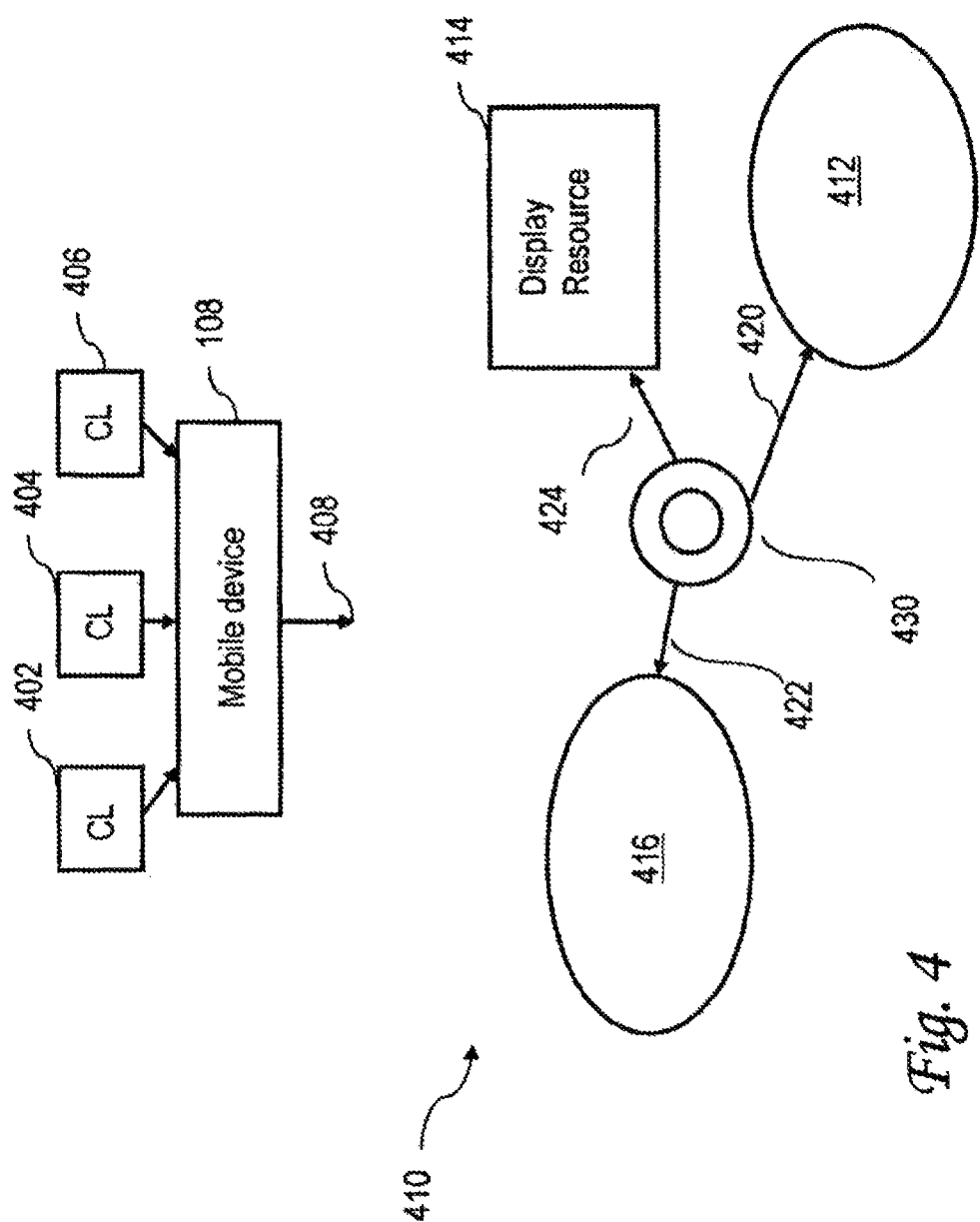
FIG. 4 is a diagram of an exemplary system map according to embodiments of the present invention.

For example, shown in FIG. 4 is a user device 108 that has received CLs from other resources 402, 404, 406. The CLs 402, 406, 408 may be, for example, a cell site, a display resource, and a network resource. The mobile device 108 integrates these CLs into a resource update 408 which in turn is broadcast by the mobile device 108 and received and stored by the SDP 102.

The stored representation of the environment is shown at 410 and includes a cell site 412, a display resource 414 and a network resource 416. The resources 412, 414, 416 correspond to the CLs 402, 404, 406, respectively. It is noted that the graphical representation of FIG. 4 is for purposes of simplicity only; the typical environment map uses internal digital computer data structures to effectively store objects such as CL 402, 404, 406.

In the example illustrated, the informational attributes of CL 402 may describe a cell site of a cellular network 412 with interface 420; the informational attributes of CL 404 may describe a RFD display device depicted as 414 with interface 424; and the informational attributes of CL 406 may describe a WiFi network depicted as 416 with interface 422. The mobile device itself is shown as a unitary structure 430 for purposes of this depiction but will be discussed later.

Thus, with reference to FIG. 4, the environment map 104 of the mobile device 108 shows that the device is in association with a display device 414 using interface 424, and has access to two networks 412 and 416 using interfaces 420, 422 respectively, the former being a WiFi network and the latter a cellular network.

The inventions discussed herein do not presuppose that a resource is necessarily associated exclusively with a single mobile device. Resources may be shared between multiples of mobile devices. It is also envisaged that the SDP 102 maintains an environment map for a plurality of mobile devices and, typically, maintains one map for all mobile devices in its purview.

Figure 5:
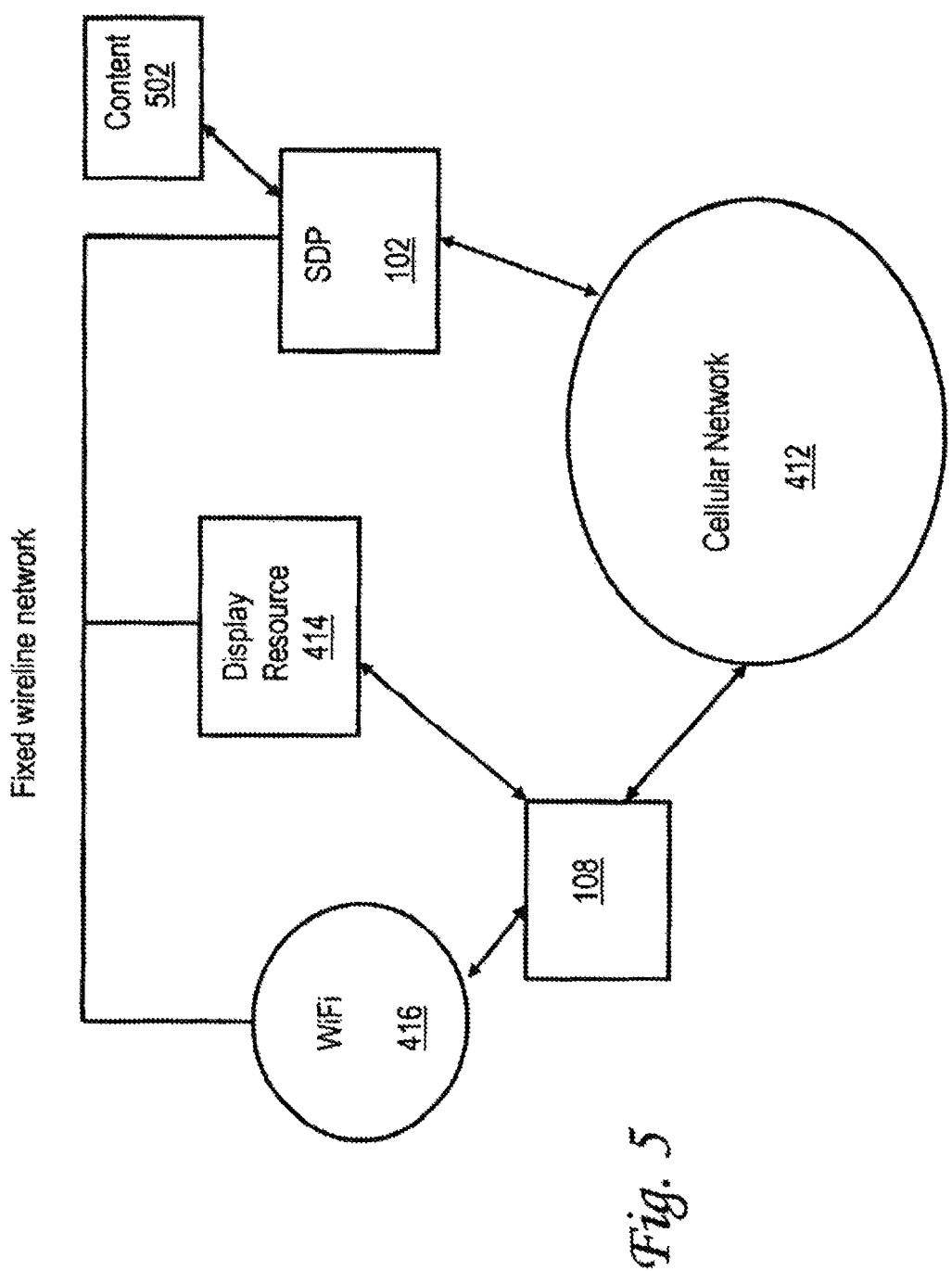
FIG. 5 is a diagram of an exemplary system map according to embodiments of the present invention.

As noted above, the environment map of mobile devices may be used to efficiently deliver to and receive information from the mobile devices. As an exemplary case, consider the problem of delivering video content from a source to the mobile device whose map 104 is depicted in FIG. 5.

The mobile device 108 is associated with a display resource 414, a cellular network 412 and a WiFi network 416. Also shown are a variety of network paths, 101, 201, 301, 501, 601, 701. Given the environment map of mobile device 108, a service profile 106 (FIG. 1) may be associated with the device that specifies that video content from a content server 502 may be delivered to either the mobile device 108 or to the display resource 414 and may further define the network path for the delivery.

In particular, the SDP 102 may choose a network path 101, 201, 301 to deliver the video content to the display resource 424. Alternatively, it may deliver the video content using the network path 101, 201, 501, 601, 301 to the mobile device 108; or it may also use the network path 701, 412. The service profile may further direct the mobile device 108 to consume the video content or to "relay" content to the display resource 424. Such a directive may be dictated by policies stated by the service provider. The SDP 102 may contain service logic using cost functions to choose any one of these paths. It may also use current network traffic and policies to prefer one path over the other possible paths.

If the SDP 102 chooses to deliver the video content to the display resource 424 and not the mobile device 108, it may first seek permission from the mobile device 100 by engaging in user dialog, such as via a graphical user interface. It is thus apparent that a user of a mobile device 108 may request video content from a server and in some cases, as depicted in FIG. 5, the video content will be received and relayed by the mobile device 108, to be displayed on a device 424 in close proximity to the mobile device.

Continuing with the example shown in FIG. 5, if the environment map of the mobile device 108 depicts that the device is in association with, for example, a Bluetooth (WiFi) network 416 generated by an automobile, the system and method of the present invention may employ a recognition unit 114 to examine the environment map 104 of a mobile device 108 to recognize that the mobile device 108 is in a pre-defined context, e.g., in an automobile and may limit access to features and services in response.

Figure 6:
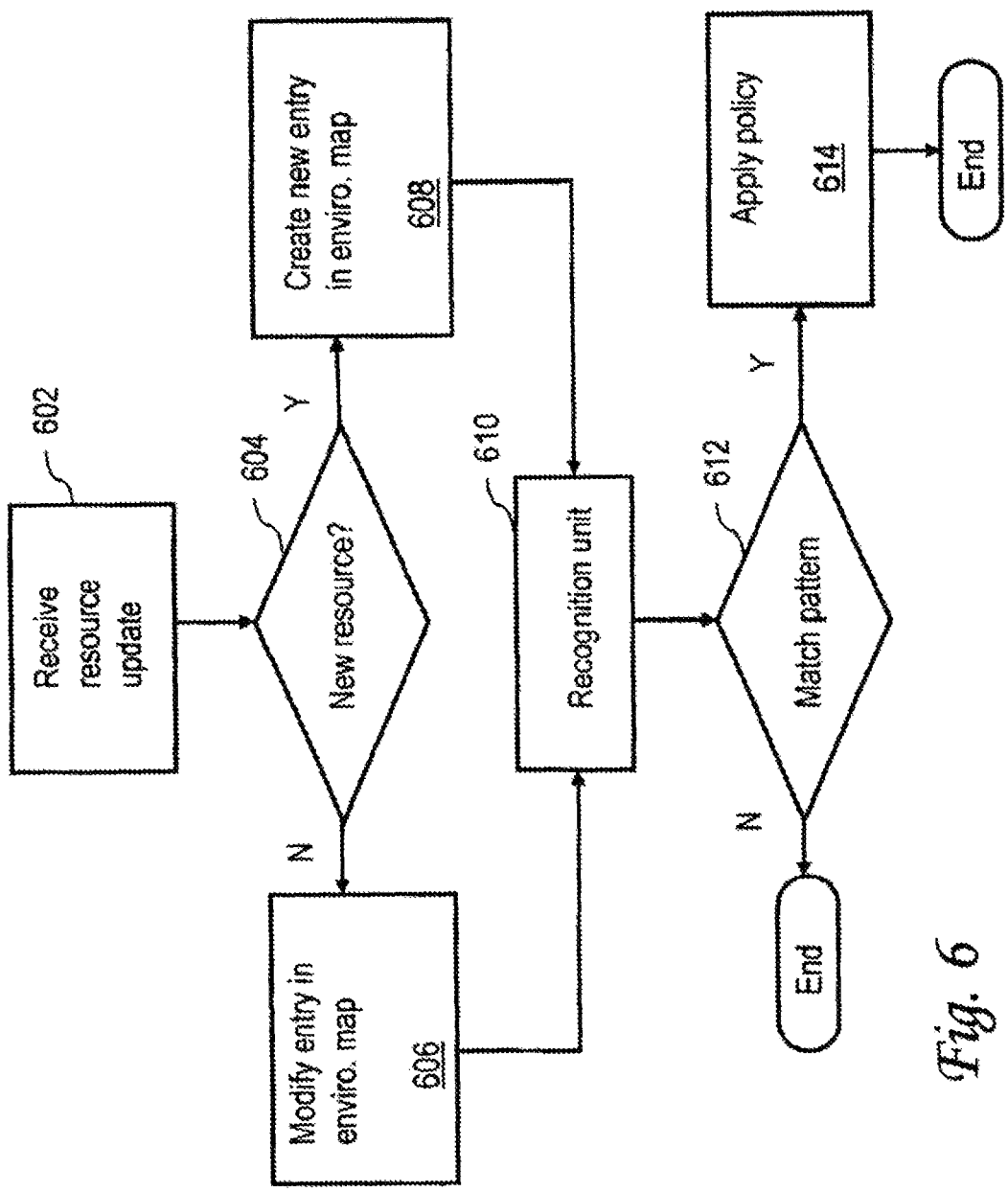
FIG. 6 is a flowchart illustrating operation of embodiments of the present invention.

This is explained further with reference to FIG. 6. The SDP 102 receives resource updates in step 602, and determines whether a resource update is for a new or a previously known mobile device (step 604). Steps 606 and 608 incorporate the received resource update into the environment map 104. In step 610, a recognition unit 115 containing pre-defined pattern matching rules is invoked that examines the environment map 104 for the mobile device 108 with the recently received resource update to determine if the map matches any of the pattern-rules of the recognition unit 115.

If a match is found, i.e., the mobile device 108 is determined to be in a pre-defined network or context or environment, e.g., connected to an automobile wifi network 416, then the recognition unit 115 returns an affirmative response and may apply a service provider policy to the environment of the mobile device, e.g., restrict SMS usage.

In another exemplary embodiment, the SDP 102 may dictate the network path chosen to deliver the video content to the display resource 424 and not to the mobile device 108. The policy enforced by the SDP 102 on behalf of the service provider may be the result of safety considerations calculated by the service provider. Thus, the user of a mobile device 108 in an automobile may view video content on the external display provided by the automobile.

Continuing further with the example depicted in FIG. 5, suppose the mobile device 108 is to be used to transmit content to the network, i.e., in the uplink direction. Again, it is apparent, that the mobile device 108 may query the environment map 104 via the SDP 102 to select a suitable network interface to use for making the transmission.

The present embodiment envisages that computing, display, storage and network resources may be abundantly available to a mobile consumer, and the consumer may choose to use such resources through the system and method described in the present invention. Moreover, as the consumer travels, his environment and availability of resources changes, the changes being recorded in the registries and environment map corresponding to the user's mobile device.

The description of the present embodiment, so far, has concentrated on the external resources available to a mobile device 108, and not on the applications available within the device itself. It is envisaged, as previously stated, that mobile devices contain a registry of all applications that have been loaded on to a mobile device by the service provider or by the user himself. Applications that are not registered in the registry are considered as "rogue" applications and are outside the scope of the present invention.

As described earlier, the environment map for a mobile device depicts the immediate environment of the mobile device and the SDP 102 assigns a network profile 106 to the mobile device based on the current environment map 104. It is envisaged by the present invention that the SDP 102 is also aware of the applications within the registry of the mobile device 108, and when assigning a service profile, may enforce one or more policies on the profile that cause the enablement or disablement of certain applications in the mobile device or impact delivery of information to the mobile device by other network elements.

Continuing with the example of FIG. 5, the exemplary depiction shows mobile device 108 in association with a WiFi network resource 416 generated by an automobile. This association may be assumed to trigger a policy that disables the web browser and the SMS applications in the registry of the mobile device 108. Thus, the user of the mobile device 108 will not be capable of launching the SMS or the web browser applications from the mobile device. Furthermore, the service provider may trigger network elements to disable the delivery of messages to the mobile device in question, e.g., by marking the status of the mobile device as "unavailable" in the HLR will temporarily stop delivery of messages, including SMS messages, to the mobile device.

Turning now to FIG. 9, a flowchart 900 illustrating operation of embodiment of the present invention is shown. The particular arrangement of elements in the flowchart 900 is not meant to imply a fixed order to the elements; embodiments can be practiced in any order that is practicable.

In a process step 902, a user device 108 receives or detects the addition of one or more new programs, resources, or processes that may be available to it. The new additions can include new CLs 112 and result in an updated resource registry 110, as discussed above. In a process step 904, the user device transmits the update to the SDP 102. As discussed above, this can include the user device 108 transmitting a location signal to the Home Location Register and piggy-backing the CL and registry information on top. The HLR 116 in turn provides the information to the SDP 102.

In a process step 906, the SDP 102's resource monitor 114 receives the update and provides the information to the resource map 104. In response, in a process step 908, the resource map 104 determines a new environment map for the user device (and other devices). In a process step 910, the SDP 102's recognition unit 115 accesses or updates the resource profile 106 of the particular device whose update has been received. As noted above, the profile includes one or more rules based on inferences from user contexts resulting from knowledge of the user position, device orientation, etc.

In a process step 912, the SDP 102 can receive a service request from a user device. For example, as discussed above, this can include requests for video content or the like. In a process step 914, in response, the SDP 102's recognition unit 115 determines a user situation or device, i.e., accesses and applies the rules or policy for user access to the program or application or resource. Finally, in a process step 914, the SDP 102 can allow access per the rules.

App Recommendation System and Method

As noted above, aspects of the present invention provide an app or content recommendation system based on sensory information received from a user device, typically stored as an environment or resource map.

Figure 10:
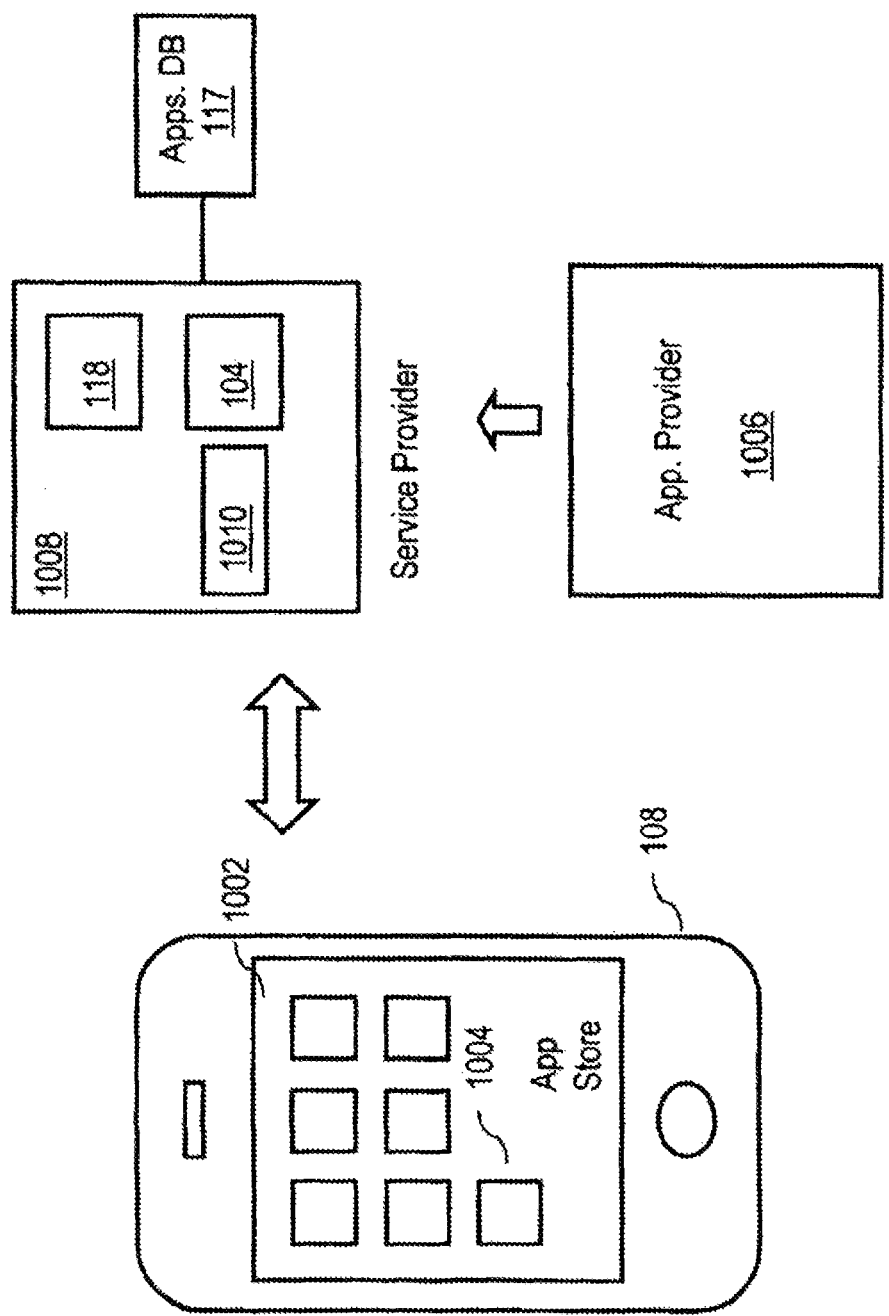
FIG. 10 is a diagram of a system in accordance with embodiments of the present invention.

FIG. 10 schematically illustrates a system for providing apps and recommendations in accordance with embodiments of the present invention. The system includes a user device 108 such as a mobile device or smartphone, including for example, a display screen of apps 1002 and an app store icon 1004. Typically, a user can click on the app store icon 1004 to communicate with an app store, browsing, selecting, and paying for selected apps.

The app store is typically provided by a service provider or service delivery platform 1008, which maintains a database of the available apps 117. As will be discussed in greater detail below, the service provider 1008 can operate a resource or environment map 104 and a controller such as an app recognition unit 118 in accordance with embodiments of the present invention. The app recognition unit 118 may implement an inference engine to determine one or more situational profiles and recommend apps (or other content, such as coupons, or other advertisements) to the user, as will be explained in greater detail below. In addition, the service provider 1008 may operate or be in communication with an accounting manager 1010 which tracks the number of times a particular app is recommended (or a coupon or advertisement is sent), for charging a fee from an app provider. The app recognition unit 118 may include or be in communication with a sensor rules database defining rules, as will be explained in greater detail below.

In addition, the system may include an app provider 1006. The app provider 1006 may be a third party provider of an app that is approved and carried by the app store or, indeed, a provider of coupons, etc. In accordance with embodiments of the present invention, the app provider 1006 can pay a fee and provide an API defining one or more rules based on the sensory data in the environment map. Alternatively, the service provider can build the API based on app provider inputs. As will be explained in greater detail below, when there is a "match" to one or more sensor based criteria, the app or other content can be recommended and the app provider can be charged a "hit" fee. In some embodiments the service provider may itself be the app provider.

In either case, in certain embodiments, a rule has the symbolic form "If X & Y & Z & . . . then A," where X, Y, and Z are antecedents (i.e., one or more sensor-based conditions), and A is the consequent. In this embodiment, the "&" represents a logical AND. It is noted that in other embodiments, a rule may have or include a logical OR as well. Typically, the antecedents are related to the situation and environment of the cell phone itself, although one or more external events from information sources may be correlated.

In accordance with embodiments of the present invention, the consequent is one or more situational profiles which can result in the recommending of one or more particularized apps or applications or other content, such as coupons or advertisements. That is, an app provider can contract to have its app or content sent or recommended to a user based upon satisfaction of one or more sensor-based antecedents, that is, the matching of a situational profile. It is noted that a particular set of antecedents could have one or more associated situational profiles.

It is envisaged that an app provider could contract with the service provider or app store provider for exclusive or non-exclusive "rights" to a particular situational profile. If the user then accepts the recommended app, installing it on his mobile device, then the user is "assigned" the situational profile. The next time the situation arises, and pursuant to the situational profile, the app can be activated. As can be appreciated, the user can be assigned any number of situational profiles.

In addition, any number of antecedents may be defined. An example of a sensor-based condition is handset is located in an environment where ambient noise level is higher than a critical level (X), and the handset is set to audible ring tone (Y). An example of a situational profile A would be that the user is attending a concert. A corresponding app might be to "turn on vibrating mode." Thus, if X and Y, then A. That is, the user can receive, e.g., a text message or other message recommending an app that would turn on the vibrating mode automatically in a noisy environment.

Exemplary rules can include sensing that a user is in motion and proposing an app that will hold incoming text messages; sensing that a user is in motion and reading a book and recommending an app that would read an online book or magazine; sensing that the user has suffered a sudden deceleration and recommending an app to dial 911 or inform authorities; sensing that a user has entered a high crime area and recommending an app that turns on tracking and issues a warning; sensing that a user is sailing and recommending a weather monitoring app; sensing that a user is attending a music festival and recommending an app that has a schedule. In each case, of course, rather than recommending an app, the system could send a coupon or other advertisement. For example, if the user is detected as being relatively near a coffee shop, the system could send a coupon.

Figure 11:
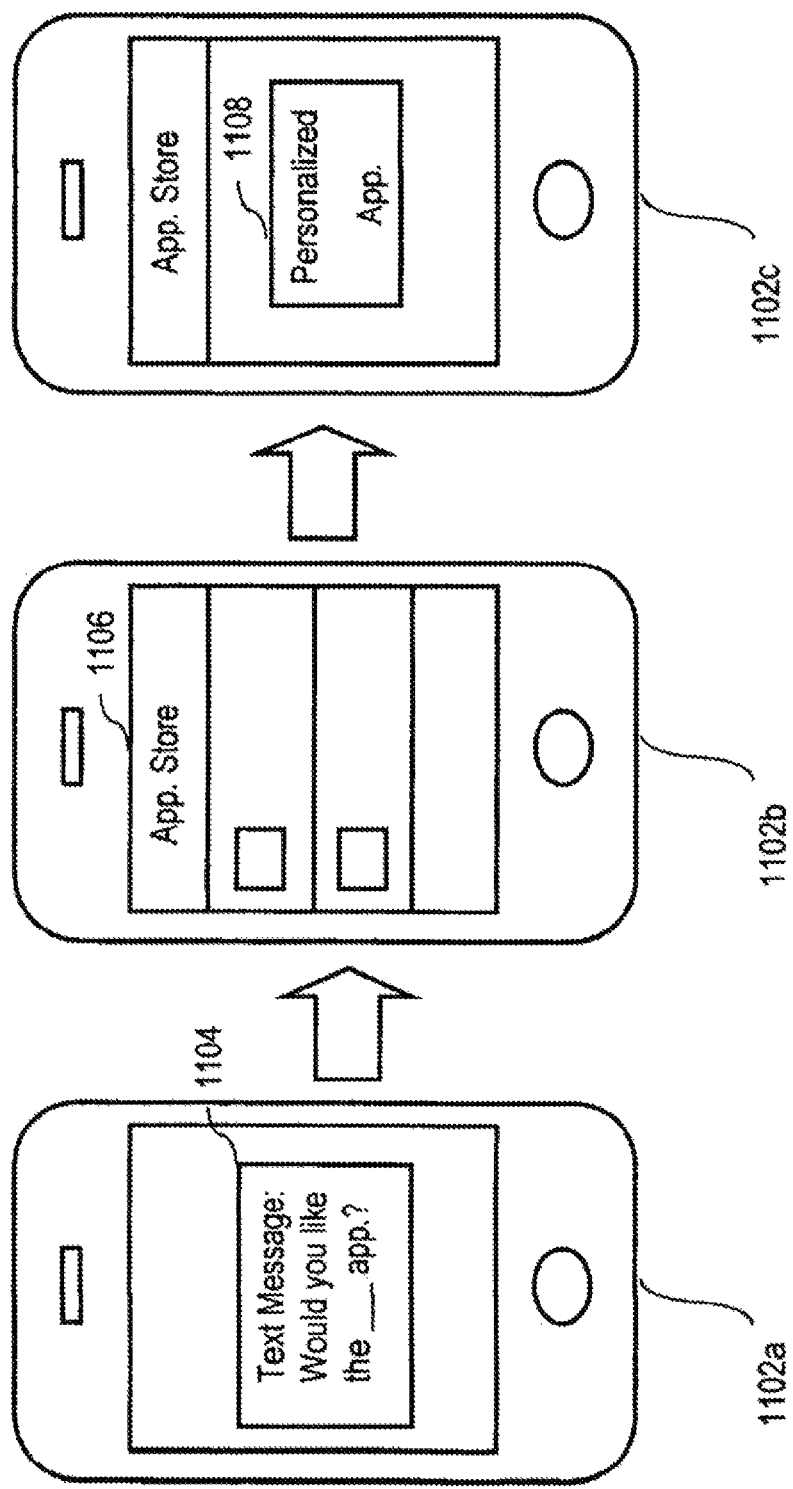
FIG. 11 is a diagram schematically illustrating operation of embodiments of the present invention.

As shown in FIG. 11, operation of such a rules-based app and content recommendation system is essentially transparent to the user. As shown at 1102 a, a user device 108 can receive a text message 1104 in response to the satisfaction of the conditions defined by the antecedents, as will be described in greater detail below. The text message can define and include a link to the associated app or apps. It is noted that e-mail or other messaging could be employed. Binary SMS messages could also be used to automatically program and instruct the device to undertake certain actions, e.g., enable and disable certain functions.

As shown at 1102b, clicking the text message at 1102a can cause the mobile device to open or navigate to an app store 1106 which includes the app or apps in question. As shown at 1102 c, the user can then select and download the recommended app or apps. Similarly, if the message could provide a coupon and a link to either the advertiser web page or a link to download the e-coupon.

It is noted that, while discussed in terms of a third-party app provider, a service provider 1008 could also define rules for recommending apps and could, indeed, recommend more than one app for a particular situation defined by a situational profile, and from one or more app providers.

Once a situational profile has been assigned to a user, it may be used to provide a solution to the "complete the search" problem discussed earlier. That is, content or recommendations can be made to a user without requiring user input. A situational profile describes an inference made by the various components of the system (i.e., the sensory data, the rules database, the environment map). The inference can be used as a targeting mechanism for showing advertisements and other relevant content, where the targeting and "relevance" criteria are determined by the situational profile.

Operation of embodiments of the present invention may be illustrated by way of the following nonexclusive examples.

EXAMPLE 1

Suppose a mobile device/smartphone user is attending the opera and brings with him the device 108. The device's location may be reported to the service provider 1008, for example, by the HLR reporting scheme described above, or by any suitable method, such as a GPS (global positioning system) type system (not shown). In addition, one or more other sensor-based conditions, such as a level of ambient noise or the device remaining still for a predetermined period, may likewise be reported. This information may be stored by the service provider, for example, in conjunction with an environment map 104, as discussed above. The information may additionally, or alternatively, be provided to an inference engine 118, which has access to the sensor rules database. The inference engine 18 may access a rule and decide that there is a fit to an "attending opera" situational profile. A rule based on these antecedents might be, for example, to recommend an app to automatically mute, shut off the device, or activate a vibrate mode. The service provider 1008 can then transmit a message recommending the mute, vibrate, or shut down app. If the user decides to purchase and/or install the app, then the situational profile may be assigned to the user and the next time that situation arises, the app is activated and the device is muted, switched to vibrate, or turned off. The situation pursuant to the profile may then be detected locally or in conjunction with the service provider 1008.

In addition, or alternatively, the system can infer that the user is at the opera and send a message advertising a recording of the performance. An associated link could be to a site where the recording could be purchased.

EXAMPLE 2

Suppose the user has taken his smartphone 108 while sailing on Lake Michigan. The user device 108 transmits sensor information, such as location, speed, or indicia of continuous orientation changes (i.e., from bobbing up and down on waves). The inference engine 118 receives or accesses this information and determines if there is a rule and situational profile. A rule, for example, might be to recommend a squall or weather warning app when the user is detected sailing. If the user installs the app, then the next time he meets the situational profile, the weather warning app may be activated.

EXAMPLE 3

In this example, more than one situational profile arises in conjunction with a particular set of antecedents. Each of the "matched" situational profiles can be associated with its own unique set of recommended apps.

A user is in his automobile circling a given block that is known to contain a Starbuck's. The service provider 1008 receives the "circling" and "Starbuck's" information into the environment map 104, which is accessed by the inference engine 118. The inference engine 118 may then infer one or more situational profiles that may be associated with these antecedents. The service provider 1008 can then send recommendations based on the situational profiles.

One such situational profile that may be associated with these antecedents is that the user is attempting to buy a cup of coffee. In this case, the user may receive a recommendation for an app that will advise the user whenever he is near a Starbuck's. Alternatively, or in addition, the user could receive other recommendations in response to matching this situational profile. For example, the user could receive a recommendation for an app that provides an e-coupon for Dunkin Donuts.

Another situational profile that might be associated with these antecedents is that the user is simply trying to find an open parking space. In this case, the inference engine 118 could cause a recommendation for an app that monitors public or private parking spaces that might be available. If any of these apps is installed, the next time the user is detected in such a situation, the app or apps can be activated. Alternatively, the user could be provided with a coupon inline or attachment or link to a coupon for a nearby parking garage.

EXAMPLE 4

Suppose the service provider 1008 has an arrangement with (or is) a credit card provider to report usage information, i.e., external events can be in the antecedent. Suppose then, that a user's credit card is detected in use at a particular location, different than a location of the user's mobile device. A situational profile could be generated or assigned that defines a potential fraudulent use of the card. The service provider 1008 can send either a recommendation for an app to the user that notifies him of such situations, or simply a recommendation to check on the status of the card. Alternatively, the situational profile or the recommendation may also specify an action to be undertaken by the user that would validate or verify the external events. For example, the credit card transaction could be validated by requesting an entry of a personal identification or code. This fraudulent warning service could be provided, i.e., paid for by either the user himself signing up to receive such warnings, or by the store owner who wants to ensure legitimate transactions, the telecommunications service provider, or the credit card company. That is, any of these entities could subscribe to the particular situational profile.

Turning now to FIG. 12, a flowchart 1200 illustrating operation of embodiment of the present invention is shown. The particular arrangement of elements in the flowchart 1200 is not meant to imply a fixed order to the elements; embodiments can be practiced in any order that is practicable.

At a process step 1202, an app provider 1006 can develop an app (or other content) and an associated API defining one or more antecedents. As noted above, the app provider 1006 can be any developer, including, for example, a third-party, or can be the service provider itself, or a party under contract with the service provider. Also as noted above, the API defining the rules can be defined by the app provider 1008 or can be defined as a service offering by the service provider itself.

At a process step 1204, the app and API are provided to the service provider 1008 and/or installed in the service provider's network. It is noted that, in some instances, the app and API may require additional or alternative approval by the manufacturer of the mobile device or its operating system.

Finally, in a process step 1206, the API is activated pursuant to the terms, if any, agreed-upon between the service provider 1008 and the app provider 1006. Thus, the API may be used by the inference engine 118 to provide recommendations for apps or other content to users based on whether they meet the rules or match the corresponding profile(s).

Turning now to FIG. 13, a flowchart 1300 illustrating operation of embodiment of the present invention is shown. The particular arrangement of elements in the flowchart 1300 is not meant to imply a fixed order to the elements; embodiments can be practiced in any order that is practicable.

In a process step 1302, a service provider 1008 operates a network, which can include an environment map 104 and CL system such as described above. The network also can implement the API or other programs for monitoring device condition and status and recommending particularized apps and/or content. In particular, the service provider 1008 can implement an inference engine 118 that can draw inferences from sensor data and one or more sensor rules.

In a process step 1304, the service provider network detects the user device environment. For example, this can include the status reporting system described above, and can include periodically accessing the environment map for such information. In a process step 1306, the service provider 1008 implements the APIs, typically in conjunction with the inference engine 118. As discussed above, this includes determining whether predetermined condition-antecedents have been met, i.e., a situational profile is identified. If so, then in a process step 1308, the service provider 1008 can access the corresponding app or apps or other content from the app database 117 and send a message to the user that such an app or apps or content are available for download. In the case of coupons and advertisements, the message itself may be the content.

In a process step 1310, the service provider 1008 can communicate with the user device 108 which received the message. For example, the user device 108 can "browse" the app store or a coupon or advertiser link over the Internet or over the provider's network. In a process step 1312, the app or apps or other content can be sent to the user and activated on his smartphone. Finally, in a process step 1314, the user can be billed or his account charged for the app or apps. In addition, in some embodiments, the service provider 1008 can charge or receive a fee from the app provider whenever a particular situational profile is "hit," even if the corresponding app or coupon or advertisement is not downloaded. That is, the service provider 1008 can charge a fee for every recommendation.

Turning now to FIG. 14, a flowchart 1400 illustrating operation of embodiment of the present invention is shown. The particular arrangement of elements in the flowchart 1400 is not meant to imply a fixed order to the elements; embodiments can be practiced in any order that is practicable.

In a process step 1402, the user device 108 stores the app and the situational profile, in a manner similar to that discussed above. The user device 108 may then monitor for the antecedents corresponding to the profile, in a process step 1404, it is noted that, in other embodiments, the monitoring profile may be implemented by the service provider 1008.

In a process step 1406, the user device 108 may match the antecedents of the situational profile. Again, in alternate embodiments, the service provider 1008 may perform the situational match, in a manner similar to that discussed above. It is noted, too, that in some embodiments, the service provider 1008 could provide additional recommendations for apps that presumably meet the situational profile (although typically would not recommend an app that has already been installed).

Finally, in a process step 1408, if there is a match, the user device 108 activates the corresponding situational app. It is noted that, in alternate embodiments, the service provider 1008 detects the match to the situational profile and transmits one or more commands to the user device to activate the corresponding app.

FIG. 7 shows a block diagram of components of a service delivery platform or service provider implemented as a computing device 700, e.g., personal, or laptop computer or server. In some embodiments, the computing device 700 may implement one more elements of the methods disclosed herein.

The system unit 11 includes a system bus or a plurality of system buses 21 to which various components are coupled and by which communication between the various components is accomplished. A processor 22, such as a microprocessor, is coupled to the system bus 21 and is supported by the read only memory (ROM) 23 and the random access memory (RAM) 24 also connected to the system bus 21. The computer 700 may be capable of high volume transaction processing, performing a significant number of mathematical calculations in processing communications and database searches. A Pentium™ or other similar microprocessor manufactured by Intel Corporation may be used for the processor 22. Other suitable processors may be available from Freescale Semiconductor, Inc., Advanced Micro Devices, Inc., or Sun Microsystems, Inc. The processor 22 also may be embodied as one or more microprocessors, computers, computer systems, etc.

The ROM 23 contains among other code the basic input output system (BIOS) which controls basic hardware operations such as the interaction of the disk drives and the keyboard. The ROM 23 may be embodied, e.g., as flash ROM. The RAM 24 is the main memory into which the operating system and applications programs are loaded. The memory management chip 25 is connected to the system bus 21 and controls direct memory access operations including passing data between the RAM 24 and hard disk drive 26 and removable drive 27 (e.g., floppy disk or flash ROM "stick"). A CD ROM drive (or DVD or other optical drive) 32 may also be coupled to the system bus 21 and is used to store a large amount of data, such as a multimedia program or a large database.

Also connected to the system bus 21 are various I/O controllers: The keyboard controller 28, the mouse controller 29, the video controller 30, and the audio controller 31. The keyboard controller 28 provides the hardware interface for the keyboard; the mouse controller 29 provides the hardware interface for the mouse 13 (or other cursor pointing device); the video controller 30 is the hardware interface for the video display 14; and the audio controller 31 is the hardware interface for a speaker and microphone (not shown). It is noted that while the various I/O controllers are illustrated as discrete entities, in practice, their functions may be performed by a single I/O controller known as a "super I/O." Thus, the figures are exemplary only.

In operation, keyboard strokes are detected by the keyboard controller 28 and corresponding signals are transmitted to the microprocessor 22; similarly, mouse movements (or cursor pointing device movements) and button clicks are detected by the mouse controller and provided to the microprocessor 22. Typically, the keyboard controller 28 and the mouse controller 29 assert interrupts at the microprocessor 22. In addition, a power management system 33 may be provided which causes the computer to enter a power down mode if no activity is detected over a predetermined period.

One or more network interfaces 40 enable communication over a network 46, such as a packet network like the Internet. The network interfaces 40 may be implemented as wired or wireless network interfaces operating in accordance with, for example, one or more of the IEEE 802.11x standards and may also or alternatively implement a Bluetooth interface.

One embodiment of the present invention is as a set of instructions in a code module resident in the RAM 24. Until required by the computer system, the set of instructions may be stored in another computer memory, such as the hard disk 26, on an optical disk for use in the CD ROM drive 32, a removable drive 27, or the flash ROM.

As shown in the figure, the operating system 50, resource monitor 104, resource map 106, resource profile(s) 114, and recognition unit 115 are resident in the RAM 24. The operating system 50 functions to generate a graphical user interface on the display 14.

Execution of sequences of the instructions in the programs causes the processor 22 to perform various of the process elements described herein. In alternative embodiments, hard-wired circuitry may be used in place of, or in combination with, software instructions for implementation of some or all of the methods described herein. Thus, embodiments are not limited to any specific combination of hardware and software.

The processor 22 and the data storage devices 26, 27, 32 in the computer 700 each may be, for example: (i) located entirely within a single computer or other computing device; or (ii) connected to each other by a remote communication medium, such as a serial port cable, telephone line or radio frequency transceiver. In one embodiment, the computer 100 may be implemented as one or more computers that are connected to a remote server computer.

As noted above, embodiments of the present invention may be implemented in or in conjunction with a telephone, such as a wireless or cellular "smart" telephone. An exemplary cellular telephone 800 including capabilities in accordance with an embodiment of the present invention is shown in FIG. 8. In some embodiments, the cellular telephone 800 may implement one or more elements of the methods disclosed herein. As shown, the cellular telephone includes control logic 802 and cellular transceiver 804. The cellular transceiver 804 allows communication over a cellular telephone network, such as a GSM or GPRS based cellular telephone network. The control logic 802 generally controls operation of the cellular telephone and, in some embodiments, implements CLs and resource registry, as well as other services or clients in accordance with embodiments of the present invention.

The control logic 802 interfaces to a memory 818 for storing, among other things, contact or address lists 107. The control logic 802 also interfaces to a user interface(s) 810. The user interface(s) 810 can include a keypad 820, speaker 822, microphone 824, and display 826. The keypad may include one or more "hard" keys, but may be implemented in whole or in part as a cursor pointing device in association with one or more "virtual" keys on the display 826. In general, a user may make use of the keypad 820 and display 826 to enter contact information, and may speak into the microphone to provide the audio input(s). It is noted that other interfaces, such as voice-activated interfaces may be provided. Thus, the figure is exemplary only. In addition, a Bluetooth or WiFi interface 806 may be provided. A memory 808 for storing program code and data, such as the CL 112 and registry 110, also may be provided.

While specific implementations and hardware/software configurations for the mobile device and SDP have been illustrated, it should be noted that other implementations and hardware configurations are possible and that no specific implementation or hardware/software configuration is needed. Thus, not all of the components illustrated may be needed for the mobile device or SDP implementing the methods disclosed herein.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described embodiments are intended to illustrate the principles of the invention, but not to limit the scope of the invention. Various other embodiments and modifications to these preferred embodiments may be made by those skilled in the art without departing from the scope of the present invention.

What is claimed is:

1. A method for activating apps on a user device, comprising:

receiving a capabilities list from one or more external resources available to the user device, each capabilities list specifying one or more attributes of the respective external resource from which it is received;

storing each of the received capabilities lists in a resource registry associated with the user device;

receiving updated capabilities lists from the one or more external resources;

dynamically updating the resource registry with one or more updated capabilities lists;

determining an environment map for the user device, the environment map comprising (i) resource environment information obtained from the resource registry and (ii) state information for the user device;

applying predefined matching rules for comparing the environment map with situational profiles, the situational profiles comprising predefined combinations of at least one of resource environment information or state information;

displaying one or more recommended apps based on the matching of the environment map to the situational profiles; and activating one of the recommended apps based on user input received in response to the displaying of the recommended apps.

2. The method of claim 1, wherein the state information for the user device comprises physical environment information obtained from one or more sensors associated with the user device.

3. The method of claim 2, wherein the physical environment information comprises location information.

4. The method of claim 2, wherein the physical environment information comprises speed information.

5. The method of claim 2, wherein the physical environment information comprises acceleration information.

6. The method of claim 2, wherein the physical environment information comprises sound information.

7. The method of claim 1, wherein the state information for the user device comprises user device settings.

8. The method of claim 7, wherein user device settings comprise audible notification settings.

9. The method of claim 1, wherein the state information for the user device comprises physical setting information.

10. The method of claim 9, wherein the physical setting information indicates presence in a vehicle.

11. The method of claim 9, wherein the physical setting information indicates proximity to a predetermined business establishment.

12. The method of claim 9, wherein the physical setting information indicates presence in a predetermined geographical area.

13. The method of claim 9, wherein the physical setting information indicates user engagement in a predetermined activity.

14. A user device comprising:

a processor; and a non-transitory computer-readable medium comprising instructions stored thereon, that when executed on the processor, perform the steps of:

receiving a capabilities list from one or more external resources available to the user device, each capabilities list specifying one or more attributes of the respective external resource from which it is received;

storing each of the received capabilities lists in a resource registry associated with the user device;

receiving updated capabilities lists from the one or more external resources;

dynamically updating the resource registry with one or more updated capabilities lists;

determining an environment map for the user device, the environment map comprising (i) resource environment information obtained from the resource registry and (ii) state information for the user device;

applying predefined matching rules for comparing the environment map with situational profiles, the situational profiles comprising predefined combinations of at least one of resource environment information or state information;

displaying one or more recommended apps based on the matching of the environment map to the situational profiles; and activating one of the recommended apps based on user input received in response to the displaying of the recommended apps.

15. The method of claim 14, wherein the state information for the user device comprises physical environment information obtained from one or more sensors associated with the user device.

16. The method of claim 15, wherein the physical environment information comprises location information.

17. The method of claim 15, wherein the physical environment information comprises speed information.

18. The method of claim 15, wherein the physical environment information comprises acceleration information.

19. The method of claim 15, wherein the physical environment information comprises sound information.

20. The method of claim 14, wherein the state information for the user device comprises user device settings.

21. The method of claim 20, wherein user device settings comprise audible notification settings.

22. The method of claim 14, wherein the state information for the user device comprises physical setting information.

23. The method of claim 22, wherein the physical setting information indicates presence in a vehicle.

24. The method of claim 22, wherein the physical setting information indicates proximity to a predetermined business establishment.

25. The method of claim 22, wherein the physical setting information indicates presence in a predetermined geographical area.

26. The method of claim 22, wherein the physical setting information indicates user engagement in a predetermined activity.

* * * * *